United States Patent
Agarwal et al.

(10) Patent No.: US 12,527,621 B1
(45) Date of Patent: Jan. 20, 2026

(54) APPARATUS AND METHOD FOR DETERMINING A TISSUE SUSCEPTIBILITY VALUE

(71) Applicant: Anumana, Inc., Cambridge, MA (US)

(72) Inventors: Animesh Agarwal, San Mateo, CA (US); Suthirth Vaidya, Bengaluru (IN); Rakesh Barve, Bengaluru (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 19/037,701

(22) Filed: Jan. 27, 2025

(51) Int. Cl.
*A61B 18/14* (2006.01)
*A61B 5/318* (2021.01)
(Continued)

(52) U.S. Cl.
CPC .......... *A61B 18/1492* (2013.01); *A61B 5/318* (2021.01); *G06T 7/0012* (2013.01); *A61B 2018/00577* (2013.01); *A61B 2018/00642* (2013.01); *G06T 2207/10081* (2013.01); *G06T 2207/10088* (2013.01); *G06T 2207/20081* (2013.01)

(58) Field of Classification Search
CPC ............. A61B 34/10; A61B 5/055; A61B 2018/00577; A61B 2018/00351; A61B 2018/00839; A61B 2018/0212; A61B 18/00; A61B 5/0044; A61B 5/0036; A61B 5/0035; A61B 18/1492; A61B 5/318; A61B 2018/00642; G06T 2210/41; G06T 7/0012; G06T 2207/10081; G06T 2207/10088; G06T 2207/20081; G16H 30/20; G16H 30/40; G16H 50/20; G16H 50/50; G16H 20/40
See application file for complete search history.

(56) References Cited

U.S. PATENT DOCUMENTS

| | | |
|---|---|---|
| 8,454,589 B2 | 6/2013 | Deno et al. |
| 10,117,707 B2 | 11/2018 | Garcia et al. |

(Continued)

FOREIGN PATENT DOCUMENTS

| | | |
|---|---|---|
| WO | 2023274219 A1 | 1/2023 |
| WO | 2023096859 A1 | 6/2023 |

OTHER PUBLICATIONS

International Search Report; PCT/2025/026471; Date: Jul. 30, 2025; By: Authorized Officer Shane Thomas.

*Primary Examiner* — Courtney Joan Nelson
(74) *Attorney, Agent, or Firm* — Caldwell Intellectual Property Law

(57) ABSTRACT

An apparatus and method for determining a tissue susceptibility value from medical data. The apparatus includes an imaging device, wherein the imaging device is configured to detect an image of a subject, wherein the subject receives tissue ablation, a memory, and at least a processor communicatively connected to the memory, wherein the memory contains instructions configuring the at least a processor to receive the image of the subject, generate a tissue susceptibility prediction model, wherein the tissue susceptibility prediction model is configured to receive, as input, the image of the subject, and determine a tissue susceptibility value as a function of the image, wherein the tissue susceptibility value defines a susceptibility of a tissue to the tissue ablation, display, using a downstream device, the tissue susceptibility value through a graphical user interface.

18 Claims, 8 Drawing Sheets

(51) Int. Cl.
*A61B 18/00* (2006.01)
*G06T 7/00* (2017.01)

(56) References Cited

U.S. PATENT DOCUMENTS

| | | | |
|---|---|---|---|
| 10,881,455 B2* | 1/2021 | Schwartz | G16H 10/60 |
| 11,744,515 B2* | 9/2023 | Rodriguez | A61B 5/4848 |
| | | | 606/41 |
| 12,165,774 B1 | 12/2024 | Agarwal et al. | |
| 2006/0015165 A1* | 1/2006 | Bertolero | A61B 1/12 |
| | | | 600/374 |
| 2014/0180273 A1* | 6/2014 | Nair | A61B 18/1492 |
| | | | 606/34 |
| 2021/0205017 A1 | 7/2021 | Amirana et al. | |
| 2022/0233242 A1 | 7/2022 | Oubel et al. | |
| 2023/0255684 A1 | 8/2023 | Schmidt et al. | |

\* cited by examiner

APPARATUS AND METHOD FOR DETERMINING A TISSUE SUSCEPTIBILITY VALUE

FIELD OF THE INVENTION

The present invention generally relates to the field of medicine. In particular, the present invention is directed to an apparatus and a method for determining a tissue susceptibility value.

BACKGROUND

Ablation is a medical procedure used to destroy abnormal tissue. Pulse field ablation (PFA) can be unreliable because it is challenging to determine if the targeted tissue has been fully ablated. Insufficient ablation can lead to the recurrence of symptoms, compromising the procedure's effectiveness. Additionally, variations in tissue susceptibility between patients, and even within different tissues of the same patient, highlight the need for an individualized approach.

SUMMARY OF THE DISCLOSURE

In an aspect, an apparatus for determining a tissue susceptibility value includes an imaging device, wherein the imaging device is configured to detect an image of a subject, wherein the subject receives tissue ablation, a memory, and at least a processor communicatively connected to the memory, wherein the memory contains instructions configuring the at least a processor to receive the image of the subject, generate a tissue susceptibility prediction model, wherein the tissue susceptibility prediction model is configured to receive, as input, the image of the subject, and determine a tissue susceptibility value as a function of the image, wherein the tissue susceptibility value defines a susceptibility of a tissue to the tissue ablation, display, using a downstream device, the tissue susceptibility value through a graphical user interface.

In another aspect, a method for determining a tissue susceptibility value includes receiving, using at least a processor, the image of the subject, generating, using at least a processor, a tissue susceptibility prediction model, wherein the tissue susceptibility prediction model is configured to receive, as input, the image of the subject, and determine a tissue susceptibility value as a function of the image, wherein the tissue susceptibility value defines a susceptibility of a tissue to the tissue ablation, displaying, using a downstream device, the tissue susceptibility value through a graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining a tissue susceptibility value. The apparatus includes an imaging device, wherein the imaging device is configured to detect an image of a subject, wherein the subject receives tissue ablation, a memory, and at least a processor communicatively connected to the memory. The memory contains instructions configuring the at least a processor to receive the image of the subject. The processor generates a tissue susceptibility prediction model, wherein the tissue susceptibility prediction model is configured to receive, as input, the image of the subject, and determine a tissue susceptibility value as a function of the image, wherein the tissue susceptibility value defines a susceptibility of a tissue to the tissue ablation. The memory then instructs the processor to display, using a downstream device, the tissue susceptibility value through a graphical user interface.

Figure 1:
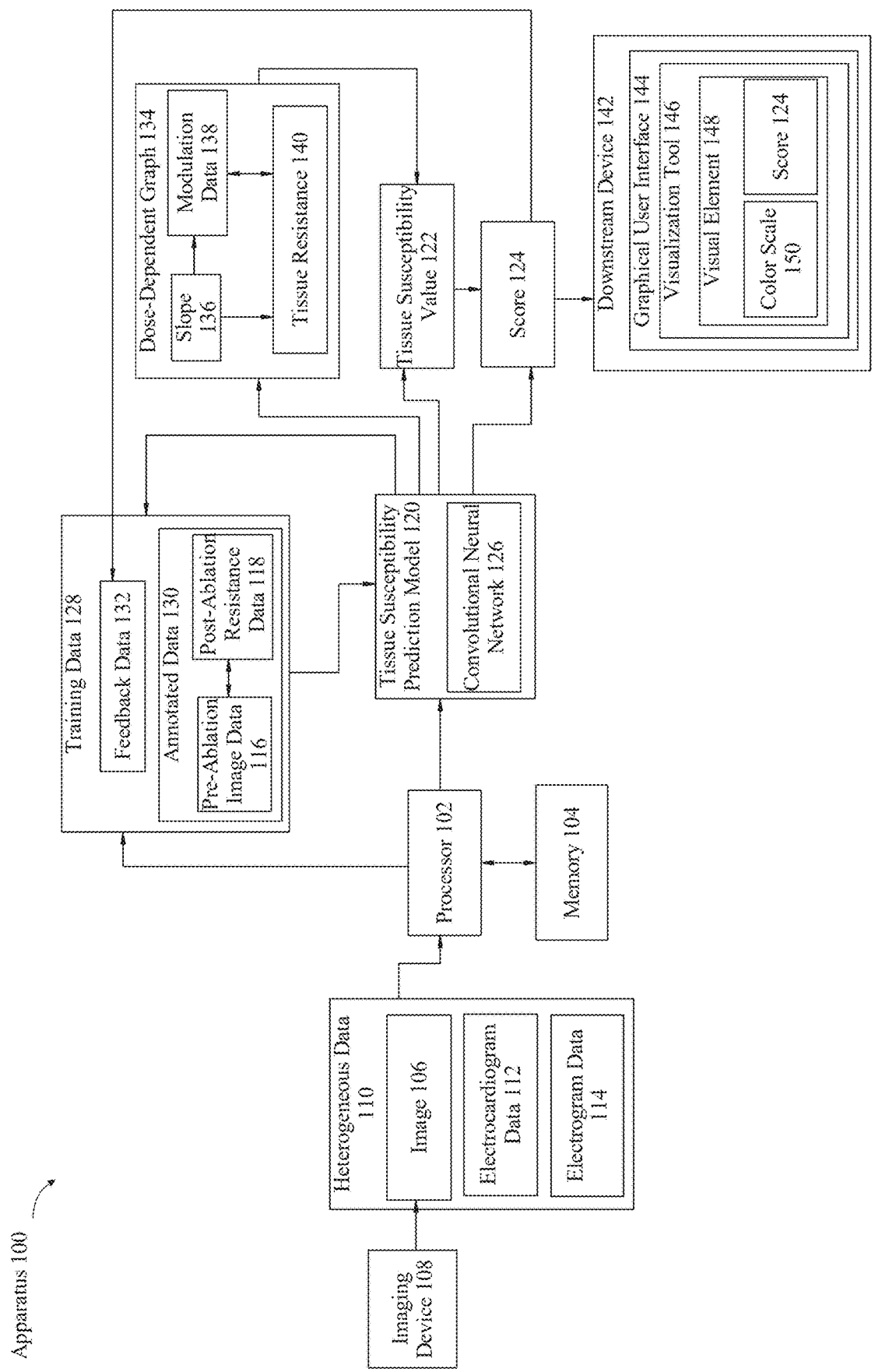
FIG. 1 is a block diagram of an apparatus for determining a tissue susceptibility value.

Referring now to FIG. 1, an exemplary embodiment of apparatus 100 for determining a tissue susceptibility value 122 is illustrated. Apparatus 100 includes imaging device 108, wherein the imaging device 108 is configured to detect image 106 of a subject, wherein the subject receives tissue ablation, a memory 104, and at least a processor 102 communicatively connected to the memory 104. As used in this disclosure, a "subject" is a patient or individual who is the focus of a medical examination, treatment, or study. Without limitation, the subject may encompass any person who is receiving healthcare services, undergoing a clinical trial, being monitored for medical research purposes, and the like. Without limitation, the subject may include individual from whom medical data, such as electrogram (EGM) data, is collected and analyzed to treat, study health-related conditions, and the like. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory 104 and a secondary memory 104. "Primary memory" also known as "random access memory" (RAM) for the purposes of this disclosure is a short-term storage device in which information is processed. In one or more embodiments, during use of the computing device, instructions and/or information may be transmitted to primary memory 104 wherein information may be processed. In one or more embodiments, information may only be populated within primary memory 104 while a particular software is running. In one or more embodiments, information within primary memory 104 is wiped and/or removed after the computing device has been turned off and/or use of a software has been terminated. In one or more embodiments, primary memory 104 may be referred to as "Volatile memory" wherein the volatile memory 104 only holds information while data is being used and/or processed. In one or more embodiments, volatile memory 104 may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory 104 and transmitted to primary memory 104 during use. In one or more embodiments, secondary memory 104 may be referred to as non-volatile memory 104 wherein information is preserved even during a loss of power. In one or more embodiments, data within secondary memory 104 cannot be accessed by processor 102. In one or more embodiments, data is transferred from secondary to primary memory 104 wherein processor 102 may access the information from primary memory 104.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor 102 power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory 104 between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor 102 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the apparatus includes imaging device 108, wherein the imaging device 108 is configured to detect image 106 of a subject, wherein the subject receives tissue ablation. As used in this disclosure, "tissue ablation" is a medical procedure that involves targeted destruction or removal of abnormal tissue within the body. Without limitation, tissue ablation may be achieved using various energy sources, such as radiofrequency, laser, microwave, cryotherapy, and the like to precisely eliminate or disrupt the unwanted tissue. In a non-limiting example, the tissue ablation procedure may be used to treat arrhythmias by destroying small areas of heart tissue that are causing irregular electrical signals, thereby restoring normal heart rhythm. Without limitation the goal of tissue ablation may be to selectively remove the problematic tissue while preserving the surrounding healthy tissue, thus improving the patient's health and reducing symptoms associated with the abnormal tissue.

With continued reference to FIG. 1, as used in this disclosure, an "imaging device" is piece of equipment designed to capture visual representations of the internal structures of a subject's body. In a non-limiting example, the imaging device 108 may utilize various types of energy, including X-rays, sound waves, magnetic fields, radio waves, and the like to create detailed images of tissues, organs, and other anatomical structures. Without limitation, the imaging device 108 may include an ultrasound machine, which uses high-frequency sound waves to visualize soft tissue structures, such as the heart or liver. Continuing, the imaging device 108 may be employed during a tissue ablation procedure to provide real-time guidance to the physician, ensuring that the targeted tissue is accurately ablated. For example, the ultrasound machine may be used to capture images of the heart in motion, allowing the physician to precisely locate areas requiring treatment. Additionally and or alternatively, the imaging device 108 may include an MRI scanner. Without limitation the MRI scanner may use magnetic fields and radio waves to generate detailed images of soft tissues. Continuing, an MRI may be used prior to an ablation procedure to map out the exact location of the targeted tissue, such as a tumor, providing crucial information for planning the procedure. In another non-limiting example, the imaging device 108 may include a CT scanner. Without limitation, the CT scanner may create cross-sectional images of the body by using X-rays and computer processing, offering a comprehensive view of the subject's anatomy. Continuing, this may be useful in cases where precise, 3D imaging is required to guide the ablation process, such as in complex liver ablations.

Still referring to FIG. 1, the at least a processor 102 is configured to receive image 106. As used in this disclosure, an "image" is a visual representation of the internal structures or functions of the human body. In a non-limiting example, the image may include X-rays, MRIs, CT scans, ultrasound images, PET scans, mammograms, fluoroscopy, echocardiograms, angiograms, nuclear medicine scans, bone scans, doppler ultrasound images, arthrograms, myelograms, endoscopic imaging, optical coherence tomography (OCT), thermography, and the like.

With continued reference to FIG. 1, receiving the image 106 of the subject may include receiving heterogeneous data 110 including the image 106 of the subject and electrocardiogram data 112. As used in this disclosure, "heterogeneous data" is a collection of diverse data types sourced from different modalities. In a non-limiting example, the heterogeneous data 110 may include various forms of imaging data, electrical signals, other relevant measurements, and the like. In some embodiments, heterogeneous data 110 may be referred to as multimodal data. Continuing, multimodal data may include a combination of textual, audio, visual, and sensor data, among others, that may be integrated and analyzed together to provide a comprehensive understanding or to perform complex tasks within a system. In some embodiments, multimodal data may include data from multiple imaging modalities. In some embodiments, multimodal data may include data from multiple medical imaging modalities. In a non-limiting example, the heterogeneous data 110 may include computed tomography (CT) scans, magnetic resonance imaging (MRI) scans, electrocardiogram (ECG) data, and electrogram (EGM) data. In a non-limiting example, the heterogeneous data 110 may provide a comprehensive view of the subject under analysis, allowing for more accurate assessments and predictions. Without limitation, the heterogeneous data 110 may include subject demographic information, such as age, gender, and medical history, and may be integrated to enhance the predictive accuracy of the model. Continuing, the apparatus may utilize a database to organize and manage the image 106. This database may be implemented as a relational database, a NoSQL database, or any other suitable format discussed herein. The database may store data entries and records, which may be flagged or linked to additional information for easy retrieval and analysis. In some embodiments, the database may be distributed across multiple servers or storage devices to enhance performance and reliability.

With continued reference to FIG. 1, as used in this disclosure, "computed tomography (CT) scans" are a type of medical imaging that uses X-rays and computer processing to create detailed cross-sectional images of the body. Without limitation, CT scans may provide a comprehensive view of internal structures, allowing for the visualization of bones, blood vessels, and soft tissues with high resolution. As used in this disclosure, "magnetic resonance imaging (MRI) scans" are a non-invasive imaging technique that uses strong magnetic fields and radio waves to produce detailed images of the organs and tissues in the body. Without limitation, MRI scans may provide visualizations for soft tissues, such as the brain, muscles, and connective tissues, without the use of ionizing radiation. As used in this disclosure, "electrogram (EGM) data" is the electrical signals recorded directly from the heart's surface or from within the heart, using electrodes placed internally. Without limitation, unlike ECG data 112, which is obtained from the body surface, EGM data 114 may provide more localized and detailed information about the heart's electrical activity. In a non-limiting example, EGM data 114 may be crucial for understanding complex arrhythmias and guiding procedures such as cardiac ablation.

With continued reference to FIG. 1, as used in this disclosure, "electrocardiogram (ECG) data" is the electrical signals generated by the heart during each heartbeat, recorded by an electrocardiogram. ECG data 112 may provide insights into the heart's rhythm, electrical activity, and overall function. As used in the current disclosure, a "electrocardiogram signal" is a signal representative of electrical activity of heart. The ECG signal may consist of several distinct waves and intervals, each representing a different phase of the cardiac cycle. These waves may include the P-wave, QRS complex, T wave, U wave, and the like. The P-wave may represent atrial depolarization (contraction) as the electrical impulse spreads through the atria. The QRS complex may represent ventricular depolarization (contraction) as the electrical impulse spreads through the ventricles. The QRS complex may include three waves: Q wave, R wave, and S wave. The T-wave may represent ventricular repolarization (recovery) as the ventricles prepare for the next contraction. The U-wave may sometimes be present after the T wave, it represents repolarization of the Purkinje fibers. The intervals between these waves may provide information about the duration and regularity of various phases of the cardiac cycle. The ECG signal may help diagnose various heart conditions, such as arrhythmias, myocardial infarction (heart attack), conduction abnormalities, and electrolyte imbalances. In one or more embodiments, ECG signals may be received by one or more electrodes connected to the skin of an individual. In one or more embodiments, ECG signals may represent depolarization and repolarization occurring in the heart. In one or more embodiments, ECG signals may be captured periodically. For example, and without limitation, every second, every millisecond and the like. In one or more embodiments, each ECG signal may contain an associated time variable. "Time variable" for the purposes of this disclosure is information indicating the time at which a particular ECG signal was received. For example, and without limitation, time variable may include, 5 ms, 10 ms, 15 ms and the like. In one or more embodiments, each ECG signal may contain a time variable. In one or more embodiments, time variable may increase in given increments, such as for example, in increments of 5 ms, wherein a first time variable may include 5 ms and a second time variable may include 10 ms. In one or more embodiments, a combination of a plurality of ECG signals and correlated time variable may be used to generate a graph illustrating the heart functions of an individual. In one or more embodiments, matrix may include a plurality of ECG signals and correlated time variable during a given time frame such as, for example, over the span of a second, a minute, an hour, and the like. In one or more embodiments, ECG signals may be captured as voltages, such as millivolts or microvolts.

With continued reference to FIG. 1, processor 102 is configured to process the heterogeneous data 110, wherein processing the heterogeneous data 110 includes normalizing the heterogeneous data 110 into a standard format and generating processed data. As used in this disclosure, "processed data" is data that has been transformed and standardized from its raw form into a consistent format that is suitable for analysis. Without limitation, the processing may involve normalizing the heterogeneous data to ensure uniformity and compatibility across different data types, making it possible to integrate and analyze diverse datasets effectively. For instance, without limitation, the processor 102 may convert CT scans and MRI scans into a standardized format, such as DICOM, to ensure that all images have consistent resolution, orientation, and metadata. Without limitation, this standardization may allow for seamless integration and comparison of images from different sources, facilitating more accurate diagnostic assessments. In another example, the processor 102 may handle electrical signal data, such as ECG and EGM recordings, by normalizing the signal amplitudes and time intervals. Continuing, raw ECG data 112 may come with varying voltage levels and sampling rates, depending on the equipment used. Continuing, the processor 102 may normalize these signals to a common baseline, ensuring that the amplitude and frequency of the heartbeats are consistent across different recordings. Continuing, this normalization process allows for more reliable analysis of cardiac rhythms and the detection of abnormalities, such as arrhythmias, by comparing the processed data against established clinical benchmarks. Additionally and or alternatively, the processor 102 may integrate biochemical data, such as blood biomarkers, into the analysis. Continuing, raw biochemical data may include measurements of various proteins, enzymes, other molecules at different concentration levels, and the like. Without limitation, the processor 102 may normalize these concentrations to a standard unit of measurement, such as nanograms per milliliter (ng/mL), and adjust for factors like subject age, gender, and baseline health conditions. In another non-limiting example, the processor 102 may handle subject demographic information, such as age, gender, and medical history, by converting this data into a standardized format that can be easily integrated with other datasets. For example, without limitation, age may be normalized to a common unit, such as years, and medical history can be encoded using standardized medical codes, such as ICD-10. Continuing, this normalization process ensures that demographic data is compatible with other types of data, allowing for comprehensive analyses that take into account the subject's overall health profile.

With continued reference to FIG. 1, the apparatus may be configured to receive modulation data from an ablation probe. As used in this disclosure, "modulation data" is dosage data that quantifies the amount of energy being delivered by the ablation probe to tissue during an ablation procedure. In a non-limiting example, modulation data may encompass the intensity, duration, and frequency of the energy applied, which may be in the form of electrical energy, thermal energy, or other modalities used to achieve the desired therapeutic outcome. In another non-limiting example, modulation data may include parameters such as the wattage of radiofrequency energy, the duration of laser pulses, or the cooling temperature applied during cryoablation. Continuing, the modulation data may help ensure that the energy dosage is carefully controlled and adjusted to optimize treatment effectiveness while minimizing damage to surrounding healthy tissues. Continuing, by monitoring and adjusting the modulation data, medical professionals can tailor the procedure to the individual characteristics of the targeted cells, making the treatment more precise and personalized. As used in this disclosure, an "ablation probe" is a medical device specifically designed to deliver targeted energy to tissues in order to destroy or remove unwanted or abnormal cells. In a non-limiting example, an ablation probe may be configured to use radiofrequency (RF) energy, laser energy, or cryotherapy to perform ablation, depending on the type of procedure being conducted. Without limitation, the ablation probe may include sensors, electrodes, or other components to ensure precise control and monitoring of the ablation process.

Still referring to FIG. 1, processor 102 is configured to generate tissue susceptibility prediction model 120, wherein the tissue susceptibility prediction model 120 is configured to receive, as input, the image 106 of the subject, and determine tissue susceptibility value 122 as a function of the image 106, wherein the tissue susceptibility value 122 defines a susceptibility of a tissue to the tissue ablation. As used in this disclosure, a "tissue susceptibility prediction model" is a component or system within an apparatus designed to receive processed data, analyze it, and generate predictive outputs. In a non-limiting example, the tissue susceptibility prediction model 120 may be configured to calculate tissue susceptibility value 122 and produce a score 124 based on that value, indicating the likelihood or efficacy of a given modulation data 138.

With continued reference to FIG. 1, as used in this disclosure, a "tissue susceptibility value" is a quantitative measure that indicates how responsive a particular tissue is to an external intervention. In a non-limiting example, the external intervention may include an ablation procedure. Continuing, the tissue susceptibility value 122 may be calculated based on various characteristics of the tissue, such as its density, composition, other physiological parameters, and the like, and may be used to tailor medical treatments to individual subject needs. Additionally and or alternatively, the tissue susceptibility value 122 may be derived through imaging techniques, such as MRI or CT scans, which may provide detailed information about the tissue's structure and composition. Continuing, genetic profiling of the tissue may be used to calculate the tissue susceptibility value 122 by identifying specific biomarkers or gene expressions that influence how the tissue responds to the external intervention, like tissue ablation. Without limitation, other factors that may be considered in this calculation include the tissue's temperature, electrical conductivity, or mechanical properties, which may be measured through various diagnostic tools. In a non-limiting example, diagnostic tools that may be used to measure the tissue's temperature may include infrared thermography or thermal sensors, which may provide real-time temperature readings during a procedure. Additionally and or alternatively, to assess electrical conductivity, tools such as electrical impedance tomography (EIT) or specialized probes designed to measure tissue resistance may be employed. Continuing, when considering the mechanical properties of the tissue, elastography, which is an imaging modality often used in ultrasound or MRI to evaluate tissue stiffness, may be used to gather the tissue data.

With continued reference to FIG. 1, the tissue susceptibility prediction model 120 may include a convolutional neural network 126 configured to predict the score 124. As used in this disclosure, a "convolutional neural network" is a type of deep learning model specifically designed to process structured data like images. In the tissue susceptibility prediction model 120, a CNN may be configured to analyze processed data and predict outcomes or score 124. Without limitation, calculating tissue susceptibility value 122 tailored to the specific tissue being ablated may allow doctors to determine the appropriate ablation dosage more accurately on a case-by-case basis. Continuing, by employing a neural network, susceptibility metrics may be quickly calculated across a wide range of patients, ensuring that the procedure can be optimized for diverse cases.

With continued reference to FIG. 1, the apparatus 100 may include at least a catheter, at least a transducer, and at least a localization system to produce dynamic data. As used in this disclosure, a "catheter" is a flexible tube used in medical procedures to deliver or remove fluids, measure pressures, or access internal body regions. Without limitation, the catheter may be used to deliver energy to the target tissue or to collect data. As used in this disclosure, a "transducer" is a device that converts one form of energy into another. In a non-limiting example, the transducer maybe used in medical imaging to convert electrical signals into ultrasonic waves and vice versa. In the apparatus, the transducer may be used to capture dynamic data during the ablation procedure. As used in this disclosure, a "localization system" is a set of tools and technologies used to determine and track the position of a device or target within a body. In medical applications, it aids in precisely guiding instruments, such as catheters, to the correct location. As used in this disclosure, "dynamic data" is real-time information collected. Without limitation, the dynamic data may include data collected during an ablation procedure that reflects changes or movements of the cardiac data allowing for continuous monitoring and adjustment. In a non-limiting example, the tissue susceptibility prediction model 120 may be used during the ablation procedure and this information may be used to later refine predictive models and enhance the accuracy of future procedures.

With continued reference to FIG. 1, the tissue susceptibility prediction model 120 may be trained using training data 128 which may include annotated data 130, wherein the annotated data 130 may include pre-ablation image data 116 associated with post-ablation resistance data 118.

With continued reference to FIG. 1, the memory contains instructions further configuring the at least a processor to train the tissue susceptibility prediction model 120 using training data 128 comprising pre-ablation image data 116 correlated to post-ablation resistance data 118, wherein the pre-ablation image data 116 may include pre-ablation magnetic resonance imaging data and pre-ablation computed tomography data, receiving the image 106 of the subject may include receiving magnetic resonance imaging data and computed tomography data, and the tissue susceptibility prediction model 120 may be configured to receive the magnetic resonance imaging data and the computed tomography data as input. In a non-limiting example, the training data 128 may be used to train the tissue susceptibility prediction model 120, to identify patterns or make predictions based on the input data. In a non-limiting example, training data 128 may include a combination of pre-ablation image data 116 and post-ablation resistance data 118, which may be used to build the tissue susceptibility prediction model 120 ability to predict how tissues will respond to interventions such as ablation. Continuing, the training data 128 may also include various labeled datasets, including annotated data 130, that allow the model to learn from previous outcomes and improve its predictive accuracy over time. As used in this disclosure, "annotated data" is a collection of data that is associated with medical information. In a non-limiting example, annotated data 130 may include images, raw ECG data, raw EGM data, MRI images, CT images, and the like that are labeled to provide information on the tissue cells. For instance, the image of cardiac cells may be annotated with ablation targeted, abnormal tissue cells, and healthy cardiac cells that do not require ablation. Without limitation, the training data 128 may include multimodal data as described herein.

With continued reference to FIG. 1, the pre-ablation image data 116 may include pre-ablation magnetic resonance imaging data and pre-ablation computed tomography data. Without limitation, the aforementioned data types may provide detailed anatomical and structural information about the tissue before the ablation procedure, which may be critical for training the model to accurately predict tissue susceptibility. Without limitation, the tissue susceptibility prediction model 120 may be trained to recognize patterns in the pre-ablation MRI and CT data that are associated with specific post-ablation outcomes, such as changes in tissue resistance. For example, the tissue susceptibility prediction model 120 may learn to identify certain tissue characteristics, like the density or composition visible in the MRI or CT scans, that correlate with higher or lower resistance after ablation. Continuing, this correlation may allow the tissue susceptibility prediction model 120 to predict how different regions of tissue may respond to ablation based on the pre-ablation images. Continuing, when the tissue susceptibility prediction model 120 is deployed in a clinical setting, it may receive the magnetic resonance imaging data and computed tomography data as input. Continuing, the tissue susceptibility prediction model 120 may then analyze these inputs to provide real-time predictions on how the tissue is likely to respond to the ablation procedure. For instance, without limitation, if the tissue susceptibility prediction model 120 predicts high resistance in a particular tissue region, the physician may choose to adjust the ablation parameters, such as the energy dose or duration, to optimize the outcome. Continuing, this process may be useful in complex cases where tissue response can be highly variable. For example, without limitation, in cardiac ablation procedures, certain regions of the heart may respond differently based on underlying structural abnormalities detected in the pre-ablation images. Continuing, by using the tissue susceptibility prediction model 120, clinicians may tailor their approach to each patient, enhancing the precision and effectiveness of the procedure while minimizing the risk of complications.

With continued reference to FIG. 1, in a non-limiting example, the annotated data 130 may be consistent with one or more aspects of the labeled data described in U.S. patent application Ser. No. 18/973,039, filed on Dec. 8, 2024, titled "APPARATUS AND METHOD FOR DETERMINING A LABEL DYNAMICALLY FOR A POTENTIAL SIGNAL," which is incorporated by reference herein in its entirety.

With continued reference to FIG. 1, in a non-limiting example, the annotated data 130 may be consistent with one or more aspects of the labeled data described in U.S. patent application Ser. No. 18/973,037, filed on Dec. 8, 2024, titled "APPARATUS AND METHOD FOR VALIDATING, USING USER INPUT, LABELED DATA GENERATED BY A PREDICTION GENERATOR," which is incorporated by reference herein in its entirety.

With continued reference to FIG. 1, as used in this disclosure, "pre-ablation image data" is images collected before an ablation procedure. In a non-limiting example, pre-ablation image data 116 may provide visual and structural information about the tissue targeted for ablation. In a non-limiting example, pre-ablation image data 116 may include MRI, CT scans, or ultrasound images, which show the tissue's characteristics, such as density, composition, and any abnormalities. For example, without limitation, in a cardiac ablation procedure, the pre-ablation image data 116 may consist of a series of MRI scans showing the precise location, size, and composition of the heart and the targeted cells. Continuing, the pre-ablation image data 116 may be used to plan the ablation and predict how the targeted tissue will respond to the treatment. As used in this disclosure, "post-ablation resistance data" is data that measures the tissue's response after an ablation procedure. In a non-limiting example, post-ablation resistance data 118 may include information about the tissue's resistance to the energy applied during ablation. In a non-limiting example, post-ablation resistance data 118 may include measurements of electrical impedance, temperature, or mechanical properties of the treated tissue, which indicate the effectiveness of the ablation and help assess whether the targeted cells were adequately treated. Without limitation, post-ablation resistance data 118 may be measured through various techniques, such as imaging, biopsies, or physical testing, and may include metrics such as tissue rigidity, thermal damage extent, or cell death rates. For example, without limitation, after a cardiac ablation procedure to treat arrhythmias, post-ablation resistance data 118 may include measurements of the targeted cells thickness and the extent of scar tissue formation, obtained through follow-up imaging or biopsies. Continuing, the post-ablation resistance data 118 may help evaluate whether the ablation was successful in permanently disrupting the abnormal heart tissue.

Additionally and or alternatively, with continued reference to FIG. 1, training data 128 may include feedback data. As used in this disclosure, "feedback" is the information or data that is returned to a system or process to inform and potentially modify future actions or decisions. Without limitation, the feedback data 132 may be real-time data or post-procedure information that provides insights into the effectiveness, progress, or outcomes of the ablation procedure. In a non-limiting example, the feedback data 132 may be used to make immediate adjustments during a procedure or to refine protocols and strategies for future treatments. For instance, in a cardiac ablation procedure, the feedback data 132 may include real-time electrical signal recordings from the heart, such as electrocardiogram (ECG) or electrogram (EGM) data, which indicate how the heart tissue is responding to the ablation energy. Continuing, the feedback data 132 may include the tissue susceptibility value 122 and or the score 124. Continuing, if the feedback data 132 shows that the targeted tissue is not being effectively ablated, the clinician may adjust the energy levels, duration, or technique to improve the outcome. Additionally and or alternatively, the feedback data 132 may come from imaging data, such as MRI or CT scans, that provide visual confirmation of tissue changes and ablation success. Without limitation, the feedback data 132 may play an important part in ensuring the precision and effectiveness of medical procedures. Continuing, the feedback data 132 may allow clinicians to make data-driven decisions, optimize treatment protocols, and improve subject outcomes.

With continued reference to FIG. 1, the memory 104 contains instructions further configuring the at least a processor 102 to generate dose-dependent graph 134 as a function of the tissue susceptibility value 122, wherein the dose-dependent graph comprises an X-axis denoting modulation data 138 and a Y-axis denoting tissue resistance 140. As used in this disclosure, a "dose-dependent graph" is a graphical representation that illustrates the relationship between the dose of energy applied during an ablation procedure and the tissue resistance 140. As used in this disclosure, "modulation" is the energy dose applied by the ablation probe during an ablation procedure. As used in this disclosure, "tissue resistance" is a measure of the tissue's durability or ability to withstand or respond positively to an external intervention without experiencing adverse effects or rapid deterioration. In a non-limiting example, the external intervention may be an ablation procedure. In a non-limiting example, the tissue resistance 140 may indicate the long-term effectiveness and stability of the treatment. Without limitation, the tissue resistance 140 may serve as a key metric for evaluating the success of the ablation procedure. In a non-limiting example, the X-axis of the dose-dependent graph 134 may represent the modulation data 138 or the dose, which includes both the energy applied and the duration of the ablation energy. Continuing, the X-axis may provide a measurement of how much energy is delivered to the targeted tissue during the procedure. Without limitation, the Y-axis may represent tissue resistance 140, indicating how well the targeted tissue withstands the applied energy without adverse effects.

In some embodiments, the Y-axis of the dose-dependent graph 134 may include a color scale 150 to visually represent tissue resistance 140. For instance, the color scale 150 may range from red to green, with red indicating low resistance and green indicating high resistance. Continuing, the color scale 150 may allow clinicians to quickly assess the effectiveness of the applied dose and make informed decisions about whether adjustments are needed. For example, if the graph shows a region of the tissue with a yellow color, it may suggest moderate resistance, prompting further analysis or ablation to enhance the treatment outcome. The color scale 150 feature is discussed more in detail below. Continuing, the dose-dependent graph 134 may include a slope 136 that indicates how tissue characteristics affect the outcome of the procedure as explained in detail below. Continuing, the dose-dependent graph 134 is discussed more in FIG. 3.

With continued reference to FIG. 1, the dose-dependent graph 134 may include slope 136 associated with the modulation data 138 and tissue resistance 140. As used in this disclosure, a "slope" is a measure of the steepness or incline of a line on a graph, representing the rate of change between two variables. Without limitation, the slope 136 of the dose-dependent graph 134 may indicate how one variable, such as the modulation data 138 or dose of energy applied during an ablation procedure, affects another variable, such as tissue resistance 140 or response. Without limitation, the slope 136 of the dose-dependent graph 134 may provide valuable insights into how different levels of ablation energy influence the resistance of the treated tissue. Continuing, a steeper slope 136 may suggest a direct and effective correlation between the applied dose and the enhancement of tissue resistance 140, while a flatter slope 136 might indicate areas where the treatment may be optimized for improved outcomes. In another non-limiting example, the dose-dependent graph 134 may be used to determine the optimal energy dose required to ablate a tumor effectively while preserving surrounding healthy tissue. Continuing, the slope 136 of the dose-dependent graph 134 may provide insights into the tissue's characteristics, such as its density and composition. For instance, a cardiac tumor with a high-fat content may show a different slope 136 compared to a fibrous tumor, indicating the need for tailored modulation data 138.

With continued reference to FIG. 1, in a non-limiting example, the tissue resistance 140 determination may be consistent with one or more aspects of the tissue resistance 140 prediction described in U.S. patent application Ser. No. 18/646,991, filed on Apr. 26, 2024, titled "METHOD AND APPARATUS FOR PREDICTING PULSED FIELD ABLATION RESISTANCE," which is incorporated by reference herein in its entirety.

With continued reference to FIG. 1, in a non-limiting example, the tissue resistance 140 may be consistent with one or more aspects of the tissue resistance 140 described in U.S. patent application Ser. No. 18/641,254, filed on Apr. 19, 2024, titled "SYSTEM AND METHODS FOR CORRECT NAVIGATION OF AN INSTRUMENT INSIDE A HUMAN BODY," which is incorporated by reference herein in its entirety With continued reference to FIG. 1, the at least a processor 102 may be further configured to plot the modulation data on the dose-dependent graph. In a non-limiting example, the processor may take the collected modulation data 138, which represents the dosage of energy delivered by the ablation probe to the targeted tissue, and plot this data on the x-axis of the dose-dependent graph. Continuing, the corresponding tissue response, such as tissue resistance 140, may be plotted on the y-axis, creating a visual representation of how the tissue reacts to varying levels of energy. Continuing, this graphical representation may allow medical professionals to analyze the relationship between the energy dose, or modulation data 138, and the tissue's resistance, providing insights into the optimal energy levels required for effective treatment. Continuing, the at least a processor may be configured to update the graph in real-time during the procedure, allowing for dynamic adjustments to the treatment as needed.

Still referring to FIG. 1, processor 102 is configured to display, using a downstream device 142, the tissue susceptibility value 122 through a graphical user interface 144. As used in this disclosure, a "downstream device" is an electronic device that presents information to an entity. In some cases, downstream device 142 may be configured to project or show visual content generated by computers, video devices, or other electronic mechanisms. In some cases, downstream device 142 may include a liquid crystal display (LCD), a cathode ray tube (CRT), a plasma display, a light emitting diode (LED) display, and any combinations thereof. In a non-limiting example, one or more downstream device 142 may vary in size, resolution, technology, and functionality. Downstream device 142 may be able to show any data elements and/or visual element 148 as listed above in various formats such as, textural, graphical, video among others, in either monochrome or color. Downstream device 142 may include, but is not limited to, a smartphone, tablet, laptop, monitor, tablet, and the like. Downstream device 142 may include a separate device that includes a transparent screen configured to display computer generated images and/or information. In some cases, downstream device 142 may be configured to present a graphical user interface 144 (GUI) to a user, wherein a user may interact with a GUI. In some cases, a user may view a GUI through downstream device 142. Additionally, or alternatively, processor 102 be connected to downstream device 142. In one or more embodiments, transmitting the score 124 may include displaying the score 124 at downstream device 142 using a visual interface.

With continued reference to FIG. 1, a "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 144. For example, links to decentralized platforms as described in this disclosure may be incorporated using icons. Using an icon may be a fast way to open documents, run programs etc. because clicking on them yields instant access.

With continued reference to FIG. 1, the at least a processor 102 may be further configured to display the dose-dependent graph.

With continued reference to FIG. 1, the graphical user interface 144 may include a visualization tool 146 configured to generate a visual element 148 associated with the score 124. As used in this disclosure, a "visualization tool" is a component of a graphical user interface 144 that generates visual representations of data, making it easier to interpret complex information. It may include graphs, charts, or color scales 150 to represent score 124 and or predictions. As used in this disclosure, a "visual element" is any individual component that expresses an idea and/or conveys a message. A visual element 148 may include visual data such as, but not limited to, images, colors, shapes, lines, arrows, icons, photographs, infographics, text, any combinations thereof, and the like. A visual element 148 may include any data transmitted to display device, client device, and/or graphical user interface 144. In some embodiments, visual element 148 may be interacted with. For example, visual element 148 may include an interface, such as a button or menu. In some embodiments, visual element 148 may be interacted with using a user device such as a smartphone, tablet, smartwatch, or computer.

With continued reference to FIG. 1, as used in this disclosure, a "score" is a numerical or categorical value derived from the tissue susceptibility value 122, representing the predicted effectiveness or quality of a medical procedure. The score 124 may provide a standardized metric that clinicians may use to assess the success of the intervention and make informed decisions about further treatment. For instance, without limitation, the score 124 may be a numerical value ranging from 0 to 100, where a higher score 124 indicates a higher likelihood of successful ablation. In a non-limiting example, a score 124 of 85 may suggest that the targeted tissue is highly susceptible to the modulation data 138 being used, indicating a high probability of effective treatment with minimal risk of recurrence.

With continued reference to FIG. 1, a "high score" may indicate that the targeted tissue is highly responsive to the ablation energy, suggesting that the ablation procedure is likely to be effective in completely destroying the targeted tissue. Conversely, a "low score" may indicate that the targeted tissue is resistant to the current ablation settings, prompting the clinician to consider alternative treatment options or adjust the energy levels and duration of the ablation. Without limitation the score 124 may provide a quick and intuitive way for clinicians to assess the likelihood of treatment success and make informed decisions about the next steps. For instance, during a cardiac ablation procedure, the score 124 may be displayed in real-time on a graphical user interface 144, allowing the clinician to monitor the tissue's response to the ablation energy continuously. Continuing, if the score 124 remains high throughout the procedure, the clinician can be confident that the ablation is progressing as expected. However, if the score 124 begins to drop, indicating reduced tissue susceptibility, the clinician can make immediate adjustments to the ablation settings or consider pausing the procedure to reassess the treatment plan. Without limitation, this real-time feedback may enhance the clinician's ability to make data-driven decisions, ultimately improving subject outcomes. Additionally and or alternatively, the score 124 may be used as a predictive tool during pre-procedure planning. For example, before performing a cardiac ablation, the clinician may input subject-specific data, such as imaging results, electrical signal recordings, and demographic information, into the predictive model to generate a preliminary score 124. Continuing, a high preliminary score 124 may indicate that the subject is a good candidate for the ablation procedure, with a high likelihood of success. Conversely, a low preliminary score 124 may prompt the clinician to consider additional diagnostic tests, modify the modulation data 138, or explore alternative treatment options.

With continued reference to FIG. 1, the visualization tool 146 may include a visual comparison of the image 106 and the score 124. As used in this disclosure, "visual comparison" is the process or result of evaluating two or more visual elements side by side to identify similarities, differences, or relationships between them. In a non-limiting example, the visual comparison may include a side-by-side display of the image 106 and the score 124 for a particular location within the heart. For instance, without limitation, the visual comparison may help a user visually assess whether more ablation must be performed on an area of the subjects heart or whether that area has been sufficiently ablated. In another non-limiting example, the at least a processor 102 may generate a visual comparison by overlapping a first graph associated with the image 106 with a second graph associated with the score 124. Continuing, the overlapping graph approach may enable users to directly compare the two datasets on the same visual plane. Without limitation, the overlapping graphs may make it easier for a user to spot discrepancies or confirm matches between the image 106 and the score 124. Without limitation, visualizing both sets of data simultaneously, a user may quickly evaluate the effectiveness of the ablation procedure in targeting and ablating the intended tissue.

In a non-limiting example, this process may be conducted in real time, where a surgeon actively ablates tissue and receives the score 124. Without limitation the score 124 may serve as immediate feedback, enabling the surgeon to make informed decisions about continuing or stopping the ablation based on the current tissue response. The real-time feedback provided by the score 124 may help optimize the procedure by allowing for dynamic adjustments, ensuring that the targeted tissue is effectively ablated with minimal impact on surrounding healthy tissue.

Additionally, or alternatively, the score 124 may be generated after the ablation procedure is complete. In this scenario, the score 124 may be derived from a detailed analysis that compares pre-operative imaging with post-operative imaging. The post-procedural score 124 represents a retrospective evaluation of how successfully the procedure ablated the targeted tissue, offering valuable insights into the precision and effectiveness of the ablation. This post-procedural feedback can inform future procedures, improve surgical techniques, and enhance overall subject outcomes.

Additionally and or alternatively, the at least a processor 102 may be configured to generate the visual comparison by simultaneously highlighting segments of the image 106 and the corresponding segments of the score 124 associated with that segment of data. Continuing, this simultaneous highlighting may be achieved by using different colors or shades to mark the same segments in both datasets, thereby drawing the user's attention to specific areas of interest and facilitating a more intuitive comparison. For example, without limitation, the segments indicating thoroughly ablated areas may be highlighted in green, while those indicating the need for more ablation of targeted tissue may be shown in red, enabling users to immediately identify areas of agreement or discrepancy between the datasets. Continuing, to further aid in the interpretation of the visual comparison, the apparatus may include a legend key that explains the meaning of the different colors or shades used in the highlighting. Without limitation, the legend key may be displayed alongside the visual comparison, providing a quick reference for users to understand the significance of each color or shade. For instance, without limitation, the legend key may indicate that green highlights represent thoroughly ablated areas, red highlights indicate the need to ablate more in a specific area, and yellow highlights denote areas of uncertainty or potential noise.

Additionally and or alternatively, the at least a processor 102 may generate a box around the matching data between the image 106 and the score 124. Continuing, without limitation, the box data may help users quickly identify areas where the score 124 is optimally ablated, providing a clear visual cue for the user. Conversely, areas without a box may indicate imperfect scores 124, prompting further ablation. Without limitation, by clearly delineating matching sections, the system supports users in rapidly validating the ablation procedure using image 106 against the score 124 based on the tissue susceptibility value 122 thereby streamlining the analysis and review process. This approach may enhance the user's ability to interpret complex data by providing a visually distinct representation of areas requiring further scrutiny or areas that meet expected performance criteria.

In a non-limiting example, image 106 may be compared visually using a variety of methods, such as tables or charts, to enhance the user's ability to interpret and analyze segments of the image 106 against the score 124 associated with that particular segment. Continuing, heat maps may visually represent how successful the ablation procedure was on a certain area of tissue by using color gradients to indicate areas where the score is high and low, providing an intuitive overview of ablation performance.

In another non-limiting example, tables with conditional formatting may list the score 124 and the image 106 side by side, using color-coding to highlight optimal ablation and suboptimal ablation. For example, the table visualization may organize the data into rows and columns. Without limitation, this format may allow users to systematically view and analyze specific aspects of the datasets side by side. Continuing, each row in the table may represent an individual data entry, such as a time segment of an ECG recording, while columns may contain the corresponding score. In a non-limiting example, tables with conditional formatting could be used to display the score 124 and the image 106 side by side, with color-coding applied to visually differentiate between optimal and suboptimal ablation outcomes. For instance, if the score 124 is 100, it may indicate the most optimal ablation, meaning the targeted tissue was effectively and fully treated, and this result could be highlighted in green. Conversely, if the score 124 is 0 it may signify that the area was not ablated at all, and such regions could be highlighted in red to indicate the need for further treatment. Scores 124 falling between 0 and 100 may represent varying degrees of ablation effectiveness, with a gradient of colors (such as yellow or orange) showing a scale of suboptimal to near-optimal ablation. This color-coded system may allow users to quickly assess the success of the ablation procedure, making it easier to identify areas that were successfully treated and those that may require additional attention. Furthermore, by organizing the data in this way, the table may provide a clear and intuitive method for evaluating the overall effectiveness of the procedure.

In a non-limiting example, overlayed histograms may be used to compare the distribution of the score 124 with the image 106, allowing users to visually assess how closely the ablation results align with the expected outcomes. Additionally and or alternatively, Gantt charts may visualize the timing and duration of ablation events, helping to reveal any alignment issues between the procedure and the score. Radar charts may also be employed to compare multiple variables simultaneously, providing an overview of the ablation's effectiveness across different criteria, such as tissue type or ablation location. Pie charts may break down the proportion of areas that achieved optimal ablation versus those with suboptimal results, helping to highlight any over- or under-representation within the dataset.

Additionally and or alternatively, infographics may combine various graphical elements to summarize data comparisons, using icons and diagrams to present insights in a clear and accessible format. These visual methods may allow users to gain deeper insights into how well the score 124 correlates with the image 106, helping to identify patterns, evaluate ablation performance, and make informed decisions during or after the procedure.

With continued reference to FIG. 1, the visualization tool 146 may include a filtering tool configured to display one or more of the ablation results based on a specific score range, filter out results that fall outside of that range, and reorganize the remaining data for focused analysis. As used in this disclosure, a "filtering tool" is a software feature or mechanism that enables users to refine or narrow down data by applying specific criteria or filters, facilitating more targeted evaluation of ablation effectiveness. In a non-limiting example, the filtering tool may allow users to focus on ablation results by selecting a particular range of scores, such as scores indicating optimal ablation (e.g., 90-100) or suboptimal ablation (e.g., 0-50). For instance, without limitation, the filtering tool may be used to highlight only segments that achieved high scores, indicating effective tissue ablation. As used in this disclosure, a "selected score range" refers to a range of values chosen by the user to display results that meet specific criteria for ablation effectiveness. In a non-limiting example, the selected score range may be used to filter the data to show only areas where the score indicates successful ablation, such as scores of 80 and above. The first selected score range may serve as a baseline for further analysis, helping users to focus on specific areas of interest, such as regions that require further investigation due to lower scores. A "first filter" is an initial set of criteria applied to the score 124 within the filtering tool. In a non-limiting example, the first filter may be used to show only scores 124 within a particular range, such as scores 124 between 50 and 100. Any data outside this range may be hidden or excluded from the display. Additionally and or alternatively, a "second filter" is a subsequent set of criteria applied to the score within the filtering tool. Without limitation the second filter may be applied to further refine the data, allowing the user to adjust the selection criteria or reorganize the data based on additional factors, such as specific anatomical regions or ablation duration.

With continued reference to FIG. 1, in a non-limiting example, the visualization tool 146 may be consistent with one or more aspects of the visualization tool described in U.S. patent application Ser. No. 16/952,298, filed on Nov. 19, 2020, titled "USER-INTERFACE FOR VISUALIZING ELECTRO-ANATOMICAL DATA WITH SELECTIVE CONTROL FOR EXPOSING METRICS," which is incorporated by reference herein in its entirety.

With continued reference to FIG. 1, the visual element 148 may be configured to utilize a color scale 150 corresponding to a threshold based on the tissue susceptibility value 122. As used in this disclosure, a "color scale" is a range of colors used in a visual element 148 to indicate varying levels of a metric. In a non-limiting example, the varying levels of a metric may include the score 124 or threshold. The colors represent different values or categories, aiding in the quick interpretation of data. In a non-limiting example, the color scale 150 may range from red to green, where red indicates low tissue susceptibility and green signifies high tissue susceptibility. Continuing, intermediate colors, such as yellow and orange, may represent moderate levels of susceptibility. The color scale 150 may provide information about the heart during or before an ablation procedure such as identify areas that require further attention or adjustment in the modulation data 138. Continuing, the color scale 150 may represent varying levels of a metric, such as the score 124 or threshold, which may reflect the predicted effectiveness of the ablation. For instance, a score 124 closer to 100% might be displayed in a bright green color, suggesting that the tissue has been effectively ablated, while a lower score 124 may be represented in red, indicating that the tissue requires additional treatment. Continuing, the visual feedback data 132 may help clinicians make informed decisions about the next steps in the procedure, such as adjusting the energy dosage or targeting specific areas for further ablation. Continuing, the use of a color scale 150 may permit rapid interpretation of complex data, reducing the cognitive load on clinicians and enhancing decision-making efficiency. In some embodiments, the color scale 150 may be dynamically adjusted based on real-time data inputs, allowing the visualization tool 146 to provide up-to-date feedback data 132 on tissue susceptibility. For example, without limitation, as the ablation procedure progresses and new data is collected, the colors on the scale may change to reflect any shifts in tissue response. Continuing, this dynamic capability enables clinicians to adapt their strategies in real time, optimizing treatment outcomes and improving subject care. Additionally and or alternatively, the color scale 150 may be integrated with other visual element 148, such as graphs or charts, to provide a comprehensive overview of the procedure's effectiveness, ensuring that clinicians have all the necessary information at their fingertips to deliver the best possible treatment. Without limitation, displaying the ablation dosage graphically may assist physicians in real-time, providing visual coaching that enhances their ability to perform the ablation procedure with precision. Continuing, this guidance may help ensure that the correct dosage is administered, improving the overall success of the ablation procedure.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
FIG. 2 is an illustration of a downstream device displaying a color scale associated with a score during an ablation procedure.

Referring now to FIG. 2, an illustration 200 of a downstream device displaying a color scale associated with a score during an ablation procedure. In an embodiment, the illustration 200 may include a downstream device 204, a color scale first value (CSFV) 208a, a color scale second value (CSSV) 208b, a color scale third value (CSTV) 208c, a color scale fourth value (CSFV) 208d, a visual element 212, a graphical user interface (GUI) 216, an ablation procedure 220, and a surgeon 224. In an embodiment, the downstream device 204 may display various data and visual elements related to the ablation procedure 220. In an embodiment, the downstream device 204 may be configured to present information to the surgeon 224 through the GUI 216. In an embodiment, the GUI 216 may include multiple screens showing different types of data and visualizations. In an embodiment, the color scale first value (CSFV) 208a represents the initial value on the color scale used to indicate tissue susceptibility. In an embodiment, the CSFV 208a is part of the color scale displayed on the downstream device 204. In an embodiment, the color scale second value (CSSV) 208b may follow the CSFV 208a and represents the next value on the color scale. In an embodiment, the color scale third value (CSTV) 208c may follow the CSSV 208b and represents the subsequent value on the color scale. In an embodiment, the color scale fourth value (CSFV) 208d may follow the CSTV 208c and represents the final value on the color scale. In an embodiment, the visual element 212 may be displayed on the downstream device 204 and is associated with the score generated during the ablation procedure 220. In an embodiment, the visual element 212 may utilize the color scale to provide a visual representation of the tissue susceptibility score. The GUI 216 integrates the visual element 212 and the color scale to assist the surgeon 224 in monitoring the ablation procedure 220. In an embodiment, the ablation procedure 220 may be monitored by the surgeon 224 using the downstream device 204. In an embodiment, the surgeon 224 may interact with the GUI 216 to assess the tissue susceptibility score and make informed decisions during the ablation procedure 220. In an embodiment, the illustration 200 may provide a comprehensive view of the interaction between the surgeon 224, the downstream device 204, and the visual elements displayed during the ablation procedure 220.

Figure 3:
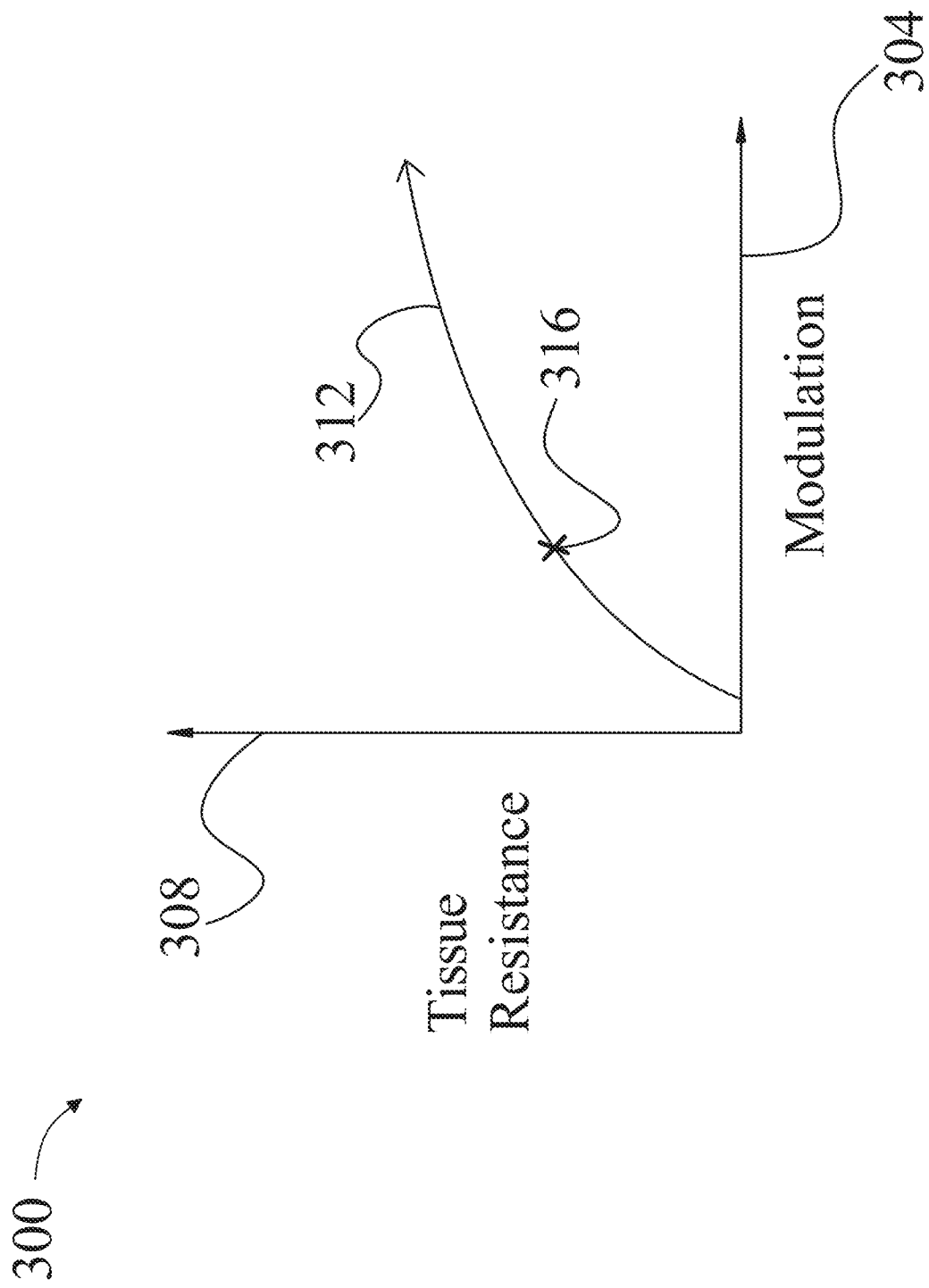
FIG. 3 is an illustration of an exemplary dose-dependent graph.

Referring now to FIG. 3, an exemplary illustration 300 of a dose-dependent graph. In an embodiment the dose-dependent graph may be a visual representation that depicts the relationship between the modulation 304 of energy applied to targeted tissue by the ablation probe and the resulting tissue response, such as tissue resistance 308. In an embodiment, the dose-dependent graph may utilize two axes to illustrate the relationship between modulation 304 and tissue resistance 308. In an embodiment, the X-axis of the dose-dependent graph may represent the modulation or the modulation 304 applied by the ablation probe to the targeted tissue. In an embodiment, the modulation 304 may refer to the amount of energy delivered, such as the intensity, duration, or frequency of the ablation. In an embodiment, the modulation 304 may encompass various forms of energy, including radiofrequency, laser, or cryotherapy energy. In an embodiment, the Y-axis may represent the tissue resistance 308, which could indicate how the targeted tissue reacts to the applied dose. In an embodiment, the tissue resistance 308 may vary depending on factors such as the tissue's composition, density, or other physiological characteristics. In an embodiment, the dose-dependent graph may allow for a visual analysis of how changes in the applied modulation 304 affect tissue resistance 308, providing valuable insights for tailoring the ablation procedure to the specific needs of the patient. In an embodiment the dose-dependent graph may include slope 312. In an embodiment, the slope 312 of the dose-dependent graph may represent the rate at which tissue resistance 308 changes in response to varying doses of energy applied by the ablation probe, indicating the sensitivity of the tissue to the energy delivered.

In an embodiment, the slope 312 of the dose-dependent graph provides critical information to the physician by quantifying how tissue resistance 308 changes in response to different levels of energy dosage applied during the ablation procedure. In an embodiment, a steep slope may indicate that even small increases in the dose result in significant changes in tissue resistance 308, suggesting that the tissue is highly responsive to the energy being delivered. Conversely, a flatter slope may indicate that higher modulation 304 may be required to achieve the desired effect on the tissue.

In an embodiment, the information derived from the slope 312 may be invaluable in real-time clinical settings, as it allows the doctor to make informed decisions about whether the administered dose is sufficient or if adjustments are necessary. For instance, without limitation, if the slope 312 indicates that the tissue resistance 308 has plateaued despite increasing the modulation 304, the physician might conclude that the optimal modulation 304 has been reached and that further energy application may not be beneficial or could even be harmful. Conversely, if the slope 312 shows a consistent increase in tissue response with rising doses, the physician may decide to continue increasing the energy dose until the desired tissue modification is achieved. Continuing, this real-time feedback helps to ensure that the ablation is both effective and safe, tailored specifically to the patient's tissue characteristics, and avoids unnecessary over-treatment or under-treatment.

In an embodiment, to enhance the usability of a real-time, dose-dependent graph in a clinical setting, adding a dynamic marker that indicates the doctor's current position on the graph can be extremely valuable. In an embodiment, the marker 316 may be represented as a distinct visual cue, such as a highlighted dot, arrow, vertical line, and the like that moves along the plot as the ablation procedure progresses. For instance, as the doctor adjusts the energy dose applied to the tissue, the marker 316 would update in real-time to show the corresponding point on the graph where the current dose and tissue resistance 308 intersect. In an embodiment, the marker 316 may allow the physician to visually track the progress of the ablation, ensuring that they are within the desired range of tissue response. In an embodiment, the real-time update of the plot, along with the moving marker 316, may help the doctor make informed decisions on whether to increase or decrease the dose based on how the tissue is reacting at each moment. In an embodiment, the marker 316 may serve as a crucial reference point, providing immediate feedback and helping to prevent overtreatment or undertreatment. In an embodiment, the ability to see the marker 316 move in response to dosage changes may enhance the interactivity and responsiveness of the system, ensuring that the procedure is tailored to the patient's specific needs in real-time.

Figure 4:
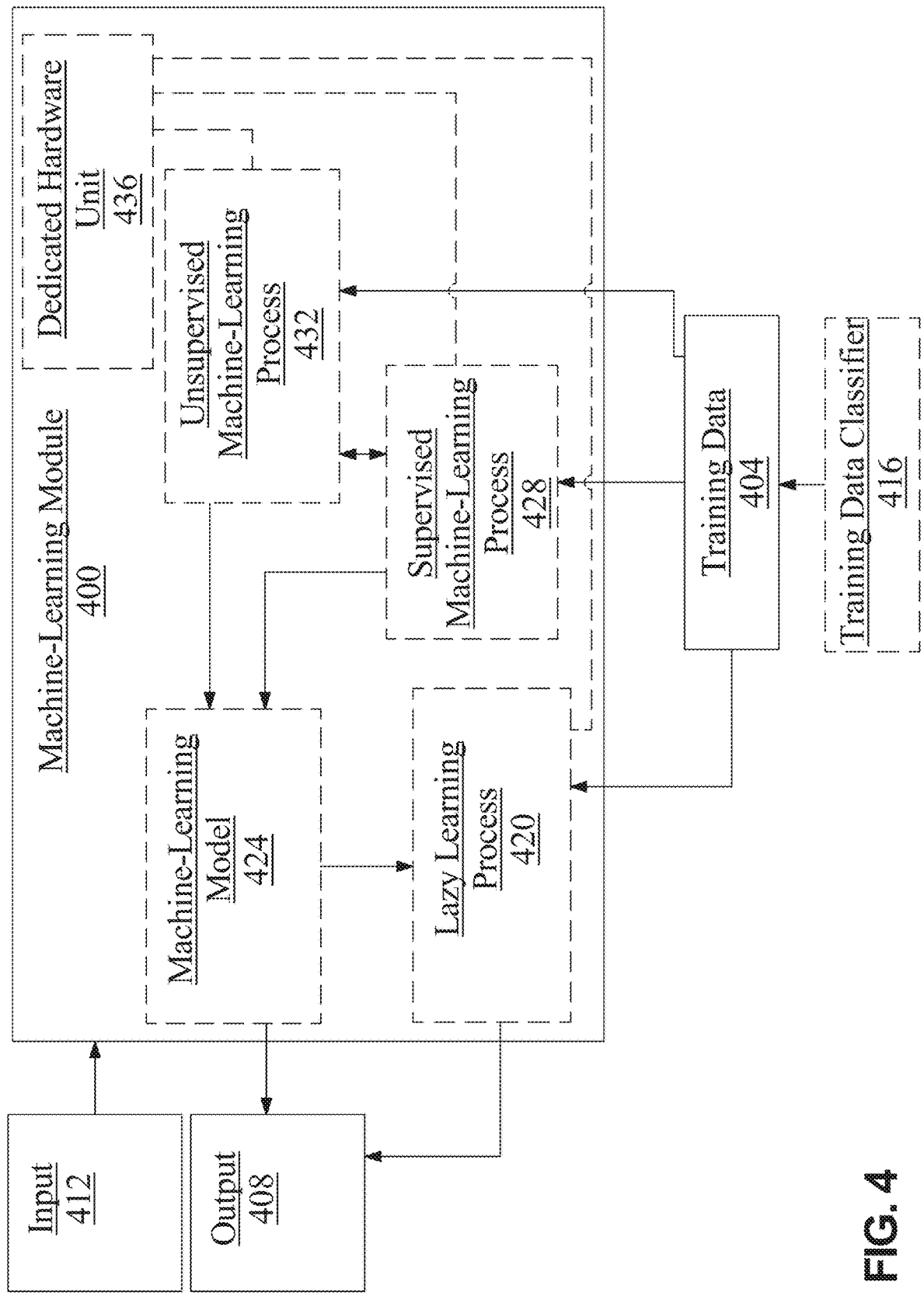
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include heterogeneous data 110, processed data and the like, outputs may include the tissue susceptibility value and the score.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to pre-operation data and post-operation data.

Still referring to FIG. 4, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=1}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process may detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that may be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include processed data and or heterogeneous data as described above as inputs, the tissue susceptibility value and or the score as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that may perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that may act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
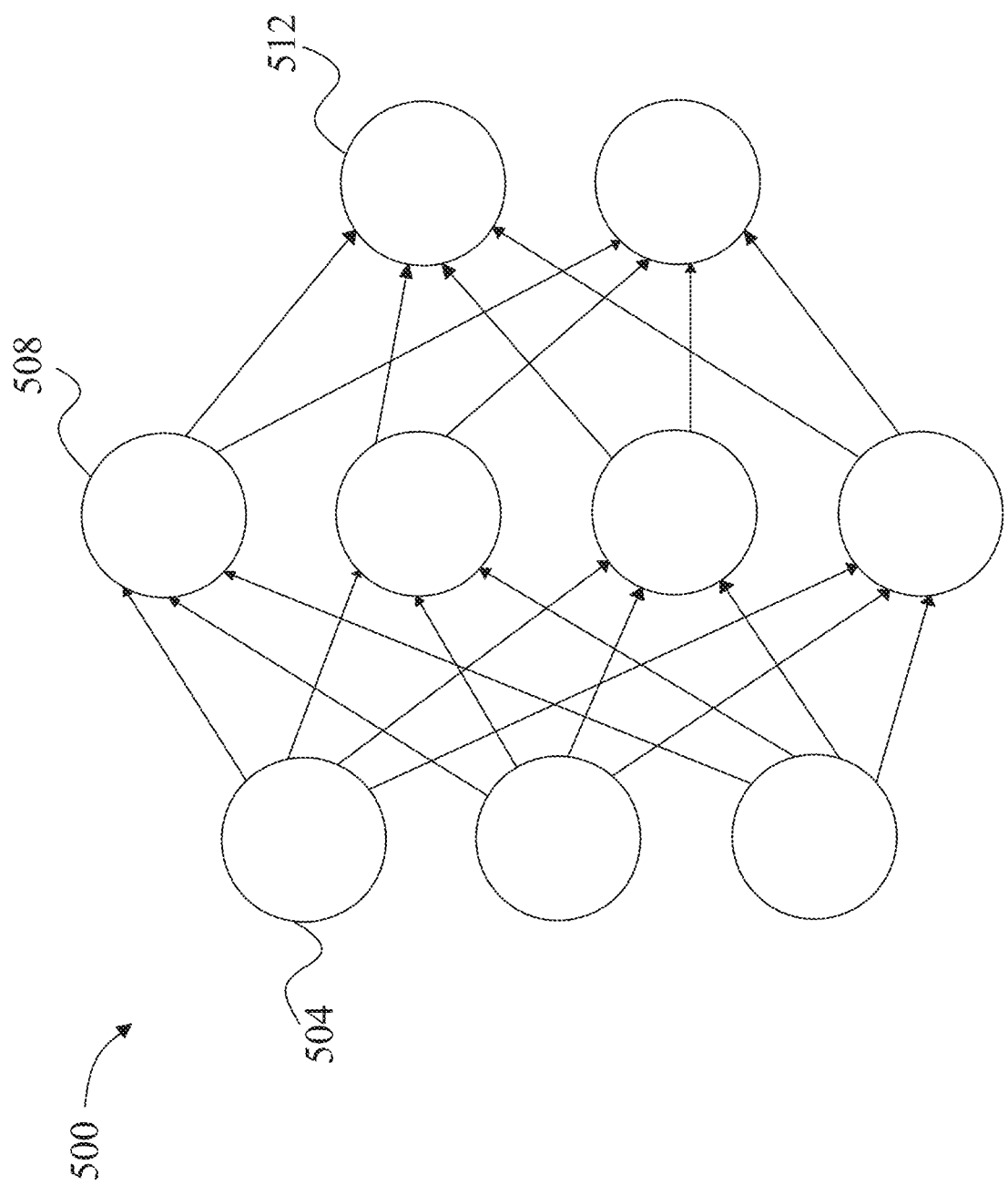
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
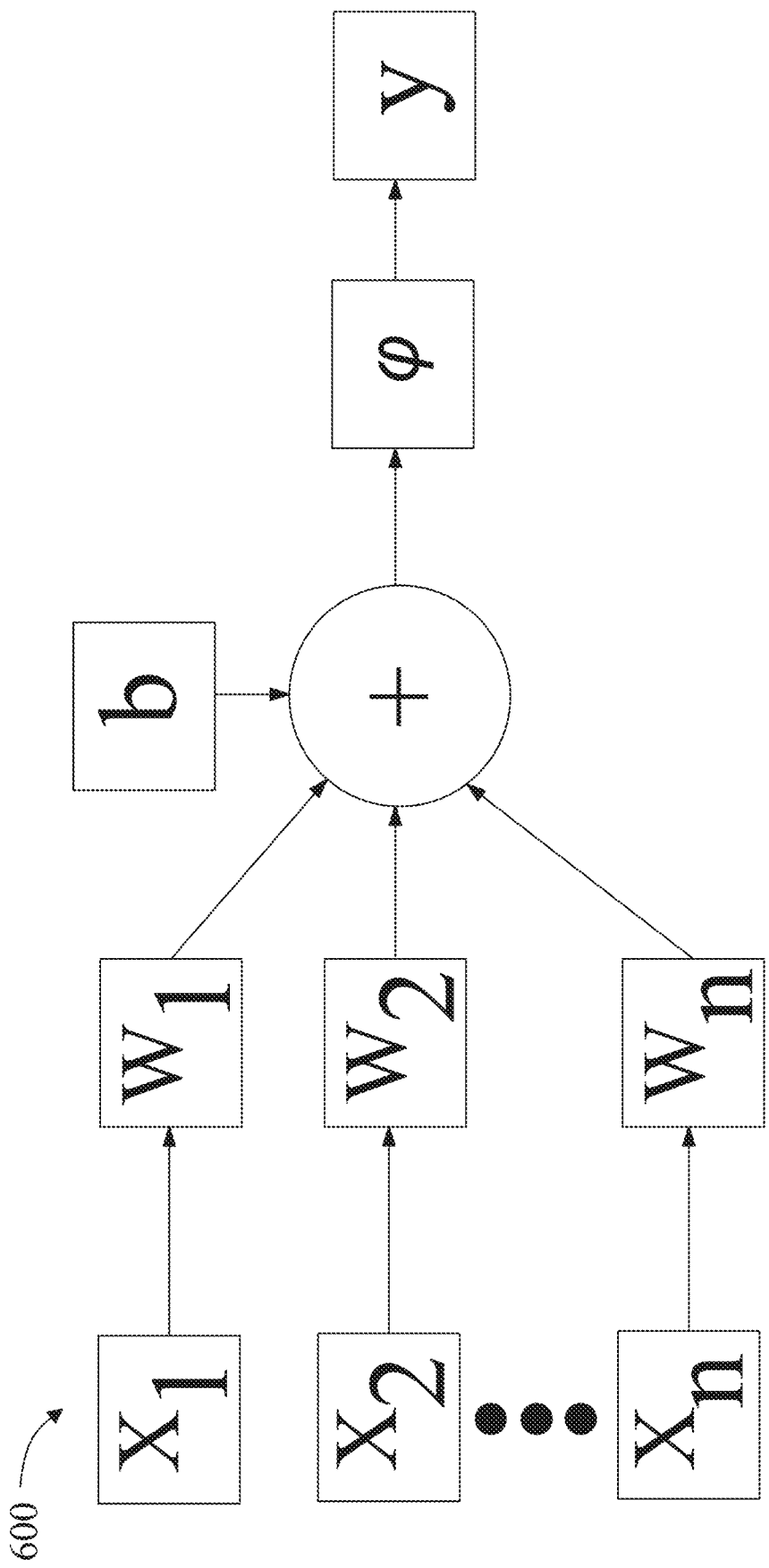
FIG. 6 is a diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
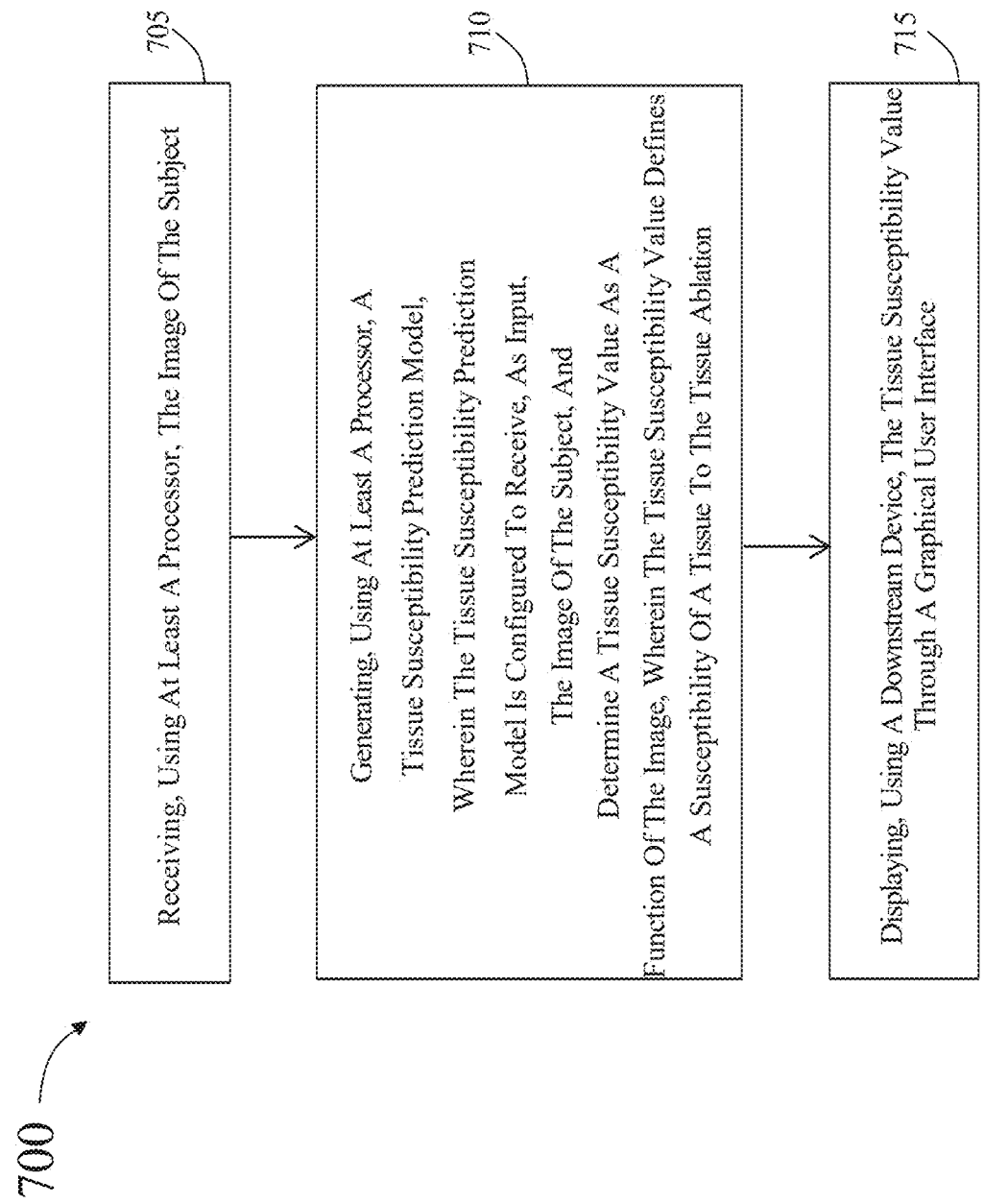
FIG. 7 is a block diagram of an exemplary method for determining a tissue susceptibility value.

Referring now to FIG. 7, a flow diagram of an exemplary method 700 for determining a tissue susceptibility value is illustrated. At step 705, method 700 includes receiving, using at least a processor, the image of the subject. This may be implemented as described and with reference to FIGS. 1-6.

Still referring to FIG. 7, at step 710, method 700 includes generating, using at least a processor, a tissue susceptibility prediction model, wherein the tissue susceptibility prediction model is configured to receive, as input, the image of the subject, and determine a tissue susceptibility value as a function of the image, wherein the tissue susceptibility value defines a susceptibility of a tissue to the tissue ablation. This may be implemented as described and with reference to FIGS. 1-6.

Still referring to FIG. 7, at step 715, method 700 includes displaying, using a downstream device, the score through a graphical user interface. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
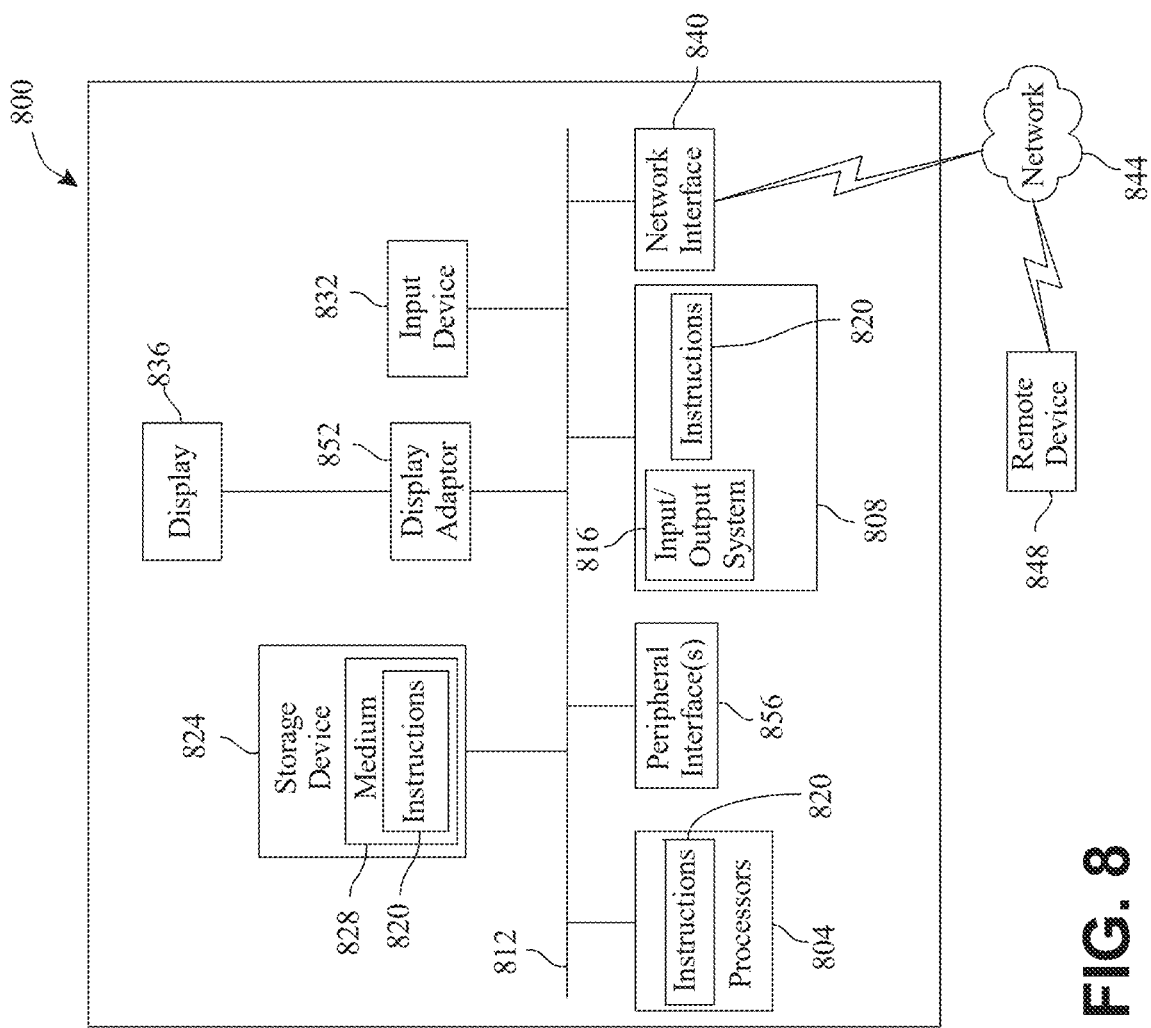
FIG. 8 is a block diagram of a computing system that may be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions may be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining a tissue susceptibility value, wherein the apparatus comprises:
   an imaging device, wherein the imaging device is configured to detect an image of a subject, wherein the subject receives tissue ablation;
   a memory; and
   at least a processor communicatively connected to the memory, wherein the memory contains instructions configuring the at least a processor to:
   receive the image of the subject;
   generate a tissue susceptibility prediction model, wherein the tissue susceptibility prediction model is configured to:
      receive, as input, the image of the subject; and
      determine a tissue susceptibility value as a function of the image, wherein the tissue susceptibility value defines a susceptibility of a tissue to the tissue ablation;
   generate a dose-dependent graph as a function of the tissue susceptibility value, wherein the dose-dependent graph comprises an X-axis denoting modulation and a Y-axis denoting tissue resistance; and
   display, using a downstream device, the tissue susceptibility value through a graphical user interface.

2. The apparatus of claim 1, wherein receiving the image of the subject comprises receiving heterogeneous data comprising the image of the subject and electrocardiogram data.

3. The apparatus of claim 2, wherein:
   the memory contains instructions further configuring the at least a processor to train the tissue susceptibility prediction model using training data comprising pre-ablation image data correlated to post-ablation resistance data, wherein the pre-ablation image data comprises pre-ablation magnetic resonance imaging data and pre-ablation computed tomography data;
   receiving the image of the subject comprises receiving magnetic resonance imaging data and computed tomography data; and
   the tissue susceptibility prediction model is configured to receive the magnetic resonance imaging data and the computed tomography data as input.

4. The apparatus of claim 1, wherein the apparatus is configured to receive a modulation data from an ablation probe.

5. The apparatus of claim 4, wherein the at least a processor is further configured to:
   plot the modulation data on the dose-dependent graph; and
   display the dose-dependent graph.

6. The apparatus of claim 1, wherein the tissue susceptibility model is trained using training data comprising annotated data, wherein the annotated data comprises pre-ablation image data associated with post-ablation resistance data.

7. The apparatus of claim 1, wherein the tissue susceptibility model comprises a convolutional neural network configured to predict a score.

8. The apparatus of claim 7, wherein the graphical user interface comprises a visualization tool configured to generate a visual element associated with the score.

9. The apparatus of claim 8, wherein generating the visual element comprises utilizing a color scale corresponding to a threshold based on the tissue susceptibility value.

10. A method for determining a tissue susceptibility value, wherein the method comprises:
    receiving, using at least a processor, an image of a subject, wherein the subject receives tissue ablation;
    generating, using at least a processor, a tissue susceptibility prediction model, wherein the tissue susceptibility prediction model is configured to:
       receive, as input, the image of the subject; and
       determine a tissue susceptibility value as a function of the image, wherein the tissue susceptibility value defines a susceptibility of a tissue to the tissue ablation;
    generate a dose-dependent graph as a function of the tissue susceptibility value, wherein the dose-dependent graph comprises an X-axis denoting modulation and a Y-axis denoting tissue resistance; and
    displaying, using a downstream device, the tissue susceptibility value through a graphical user interface.

11. The method of claim 10, wherein receiving the image of the subject comprises receiving heterogeneous data comprising the image of the subject and electrocardiogram data.

12. The method of claim 11, wherein:
    a memory contains instructions further configuring the at least a processor to train the tissue susceptibility prediction model using training data comprising pre-ablation image data correlated to post-ablation resistance data, wherein the pre-ablation image data comprises pre-ablation magnetic resonance imaging data and pre-ablation computed tomography data;
    receiving the image of the subject comprises receiving magnetic resonance imaging data and computed tomography data; and
    the tissue susceptibility prediction model is configured to receive the magnetic resonance imaging data and the computed tomography data as input.

13. The method of claim 10 further configured to receive a modulation data from an ablation probe.

14. The method of claim 13 further configured to:
    plot the modulation data on the dose-dependent graph; and
    display the dose-dependent graph.

15. The method of claim 10, wherein the tissue susceptibility model is trained using training data comprising annotated data, wherein the annotated data comprises pre-ablation image data associated with post-ablation resistance data.

16. The method of claim 10, wherein the tissue susceptibility model comprises a convolutional neural network configured to predict a score.

17. The method of claim 16, wherein the graphical user interface comprises a visualization tool configured to generate a visual element associated with the score.

18. The method of claim 17, wherein generating the visual element comprises utilizing a color scale corresponding to a threshold based on the tissue susceptibility value.

* * * * *